(12) United States Patent
Levitt

(10) Patent No.: US 11,859,477 B2
(45) Date of Patent: Jan. 2, 2024

(54) HYDROCARBON EXTRACTION USING SOLAR ENERGY

(71) Applicant: TotalEnergies SE, Courbevoie (FR)

(72) Inventor: David Levitt, Pau (FR)

(73) Assignee: TOTALENERGIES SE, Courbevoie (FR)

( * ) Notice: Subject to any disclaimer, the term of this patent is extended or adjusted under 35 U.S.C. 154(b) by 0 days.

(21) Appl. No.: 17/621,524

(22) PCT Filed: Jul. 2, 2019

(86) PCT No.: PCT/IB2019/000853
§ 371 (c)(1),
(2) Date: Dec. 21, 2021

(87) PCT Pub. No.: WO2021/001673
PCT Pub. Date: Jan. 7, 2021

(65) Prior Publication Data
US 2022/0349285 A1    Nov. 3, 2022

(51) Int. Cl.
*E21B 43/16* (2006.01)
*E21B 43/40* (2006.01)
*F25J 3/02* (2006.01)

(52) U.S. Cl.
CPC ............ *E21B 43/164* (2013.01); *E21B 43/40* (2013.01); *F25J 3/0266* (2013.01); *F25J 2260/80* (2013.01)

(58) Field of Classification Search
CPC .. E21B 43/2401; E21B 43/24; E21B 43/2406; E21B 36/003; E21B 43/40; E21B 43/164
See application file for complete search history.

(56) References Cited

U.S. PATENT DOCUMENTS

| | | |
|---|---|---|
| 3,973,567 A | 8/1976 | Srinivasan et al. |
| 8,701,773 B2 | 4/2014 | O'Donnell et al. |
| 2014/0190691 A1 * | 7/2014 | Vinegar .................. B09C 1/06 166/272.1 |
| 2014/0318792 A1 | 10/2014 | Chen et al. |
| 2016/0258263 A1 | 9/2016 | Hagen |
| 2017/0074082 A1 * | 3/2017 | Palmer .................. E21B 36/003 |

FOREIGN PATENT DOCUMENTS

| | | |
|---|---|---|
| CN | 105435581 A | 3/2016 |
| CN | 105797541 B | 8/2018 |
| EP | 1941208 B1 | 12/2008 |
| EP | 3211195 A1 | 8/2013 |
| EP | 1576266 B1 | 9/2014 |
| EP | 34063184 A1 | 11/2018 |
| EP | 2941475 B1 | 6/2019 |
| EP | 2234694 B1 | 2/2020 |
| EP | 2776683 B1 | 12/2020 |
| WO | 20080009049 A1 | 1/2008 |
| WO | 2009070785 A2 | 6/2009 |
| WO | 2009071833 A2 | 6/2009 |
| WO | 2012173855 A2 | 12/2012 |
| WO | 2012173855 A3 | 12/2012 |
| WO | 2013062922 A1 | 5/2013 |
| WO | 2014005817 A1 | 1/2014 |
| WO | 2014127410 A1 | 8/2014 |
| WO | 2017021083 A1 | 2/2017 |
| WO | 2017146589 A1 | 8/2017 |

OTHER PUBLICATIONS

Notification of Transmittal of the International Search Report and the Written Opinion of the International Searching Authority for PCT Application No. PCT/IB2019/000853, "Hydrocarbon Extraction Using Solar Energy," dated Mar. 3, 2020.

El Nasr, A., et al., "Low Cost CO2 Capture: Dream or Reality?" Society of Petroleum Engineers (2018), Abu Dhabi International Petroleum Exhibition & Conference, Abu Dhabi, UAE, Nov. 12-15, 2018.

* cited by examiner

*Primary Examiner* — Zakiya W Bates
(74) *Attorney, Agent, or Firm* — Hamilton, Brook, Smith & Reynolds, P.C.

(57) ABSTRACT

Embodiments provide functionality for extracting hyrdrocarbons from a subterranean formation. A fluid is provided and injected into a subterranean formation during a first period of time but not during a second period of time. At least part of the providing and injecting of the fluid is carried out using solar energy. Further, displaced hydrocarbons are collected from the subterranean formation.

18 Claims, No Drawings

HYDROCARBON EXTRACTION USING SOLAR ENERGY

This application is the U.S. National Stage of International Application No. PCT/IB2019/000853, filed Jul. 2, 2019, which designates the U.S., published in English. The entire teachings of the above application are incorporated herein by reference.

TECHNICAL FIELD

The present invention relates to a method for extracting hydrocarbons from a subterranean formation using solar energy.

TECHNICAL BACKGROUND

Hydrocarbons in an underground reservoir can be recovered or produced by means of one or more wells drilled in the reservoir. Before production begins, the formation (a porous medium) is saturated with hydrocarbons.

The initial recovery of hydrocarbons is generally carried out by techniques of "primary recovery", in which only the natural forces present in the reservoir are relied upon. In this primary recovery, only part of the hydrocarbons is ejected from the pores by the pressure of the formation. Typically, once the natural forces are exhausted and primary recovery is completed, water or gas is injected for maintaining the pressure in the reservoir and recovering more hydrocarbons as "secondary recovery". Usually there is still a large volume of hydrocarbons left in the reservoir, generally more than two thirds, at the end of the "secondary recovery".

This phenomenon has been known for a long time and has led to the development of many techniques of enhanced oil recovery (EOR). Many of these techniques rely on the injection of a fluid into the underground reservoir (or subterranean formation) in order to produce an additional quantity of e.g. crude oil. The fluid used can be water, steam, carbon dioxide, natural gas, nitrogen, etc.

Gas injection is presently one of the most-commonly used approaches in enhanced oil recovery. A gas that is particularly commonly used for oil displacement is carbon dioxide ($CO_2$) because it reduces the oil viscosity and is less expensive than other gases.

However, gas injection is energy intensive. Gas (or other fluid) injection is often carried out using gas turbine compressors that require gas consumption. Moreover, $CO_2$ capture for its use in enhanced oil recovery processes is expensive and necessitates high energy consumption. Indeed, $CO_2$ capture is mainly carried out using amine capture solvents that have to be heated to be regenerated. Heat is often generated by burning fossil fuels, such as natural gas. Other processes for capturing $CO_2$ generally use gas to generate compression through gas turbines. Currently, about 20% of captured $CO_2$ is re-emitted in energy consumption for capture processes.

The article by Adel Ahmed Seif El Nash et al., *Low cost $CO_2$ Capture: Dream or Reality?*, *Society of Petroleum Engineers*, SPE-192726-MS (2018) reviews different techniques for capturing $CO_2$ and their associated costs.

In the field of $CO_2$ recovery from flue gases generated by coal- or gas-fired power plants in order to reduce greenhouse gas emissions, there have been attempts to separate $CO_2$ using solar energy.

For example, documents WO 2008/009049 and WO 2014/127410 describe the use of solar thermal energy to regenerate solvents used to capture $CO_2$ from a flue gas stream.

However, solar energy is not continuously available. Energy availability is determined by isolation periods, that is to say, it has a cyclic profile. Furthermore, storage of electrical or thermal energy adds very significant costs.

There is a need for a method for extracting hydrocarbons from a subterranean formation in an effective manner, that is cost-effective, sustainable, and that does not require a high consumption of fossil fuel energy.

SUMMARY OF THE INVENTION

It is a first object of the invention to provide a method for extracting hydrocarbons from a subterranean formation, comprising:
  providing a fluid,
    injecting said fluid into the subterranean formation during a first period of time but not during a second period of time, and
    collecting displaced hydrocarbons from the subterranean formation,
wherein:
  at least part of the provision and/or injection of the fluid is carried out using solar energy.

In some embodiments, the first period of time is at least part of daytime and the second period of time is at least part of nighttime and the provision and/or injection of the fluid is carried out using solar energy.

In some embodiments, the first period of time is a period including the summer solstice and the second period of time is a period including the winter solstice.

In some embodiments, the fluid which is provided and injected comprises or is natural gas.

In some embodiments, the fluid which is provided and injected comprises or is carbon dioxide.

In some embodiments, the method further comprises:
  injecting an aqueous solution into the subterranean formation during at least part of the second period of time, preferably during the complete second period of time.

In some embodiments, the step of injecting the fluid into the subterranean formation is carried out during at least part of daytime and the step of injecting an aqueous solution into the subterranean formation is carried out during at least part of nighttime, preferably during substantially the whole nighttime.

In some embodiments, the fluid which is provided and injected comprises or is an aqueous solution.

In some embodiments, the aqueous solution is water or brine.

In some embodiments, no injection into the subterranean formation is carried out during at least part of the second period of time, preferably during the complete second period of time.

In some embodiments, the step of injecting the fluid into the subterranean formation is carried out during at least part of daytime and no injection into the subterranean formation is carried out during at least part of nighttime, preferably during substantially the whole nighttime.

In some embodiments, the step of injecting the fluid into the subterranean formation is carried out during substantially the whole daytime.

In some embodiments, the fluid injection during the first period of time is carried out using one or more electric compressors which are at least partially, and preferably completely, powered by solar photovoltaic energy.

In some embodiments, the fluid comprises a carbon dioxide stream which is produced using solar energy during at least part of daytime.

In some embodiments, the step of producing a carbon dioxide stream using solar energy is carried out during substantially the whole daytime.

In some embodiments, the produced carbon dioxide stream is injected into the subterranean formation during at least part of daytime, preferably during substantially the whole daytime.

In some embodiments, the production of a carbon dioxide stream using solar energy comprises the steps of:
providing a gas stream containing carbon dioxide;
contacting said gas stream with a liquid solvent so that at least part of the carbon dioxide contained in the gas stream is absorbed by the liquid solvent, so as to provide a carbon dioxide-enriched solvent,
heating the carbon dioxide-enriched solvent using solar thermal energy so that at least part of the carbon dioxide contained in the carbon dioxide-enriched solvent is separated from the solvent, so as to obtain a regenerated liquid solvent and the carbon dioxide stream.

In some embodiments, the liquid solvent is or comprises an amine compound.

In some embodiments, the production of a carbon dioxide stream using solar energy comprises the steps of:
providing a gas stream containing carbon dioxide;
contacting the gas stream with a membrane so as to recover a carbon dioxide stream in the permeate, and
compressing the carbon dioxide stream using one or more electrical compressors at least partially, preferably completely, powered by solar photovoltaic energy.

In some embodiments, the production of a carbon dioxide stream using solar energy comprises the steps of:
providing a gas stream containing carbon dioxide,
compressing the gas stream containing carbon dioxide using solar energy,
cooling the compressed gas stream so that carbon dioxide liquefies and/or solidifies,
separating liquid and/or solid carbon dioxide from gaseous light gases, so as to recover the carbon dioxide stream.

In some embodiments, the gas stream containing carbon dioxide comes from the subterranean formation and/or from an electrical power generation plant, preferably a fossil fuel power station, and/or from a sulfur recovery unit.

In some embodiments, the production of a carbon dioxide stream using solar energy comprises the steps of:
providing an air stream,
separating at least part of the oxygen contained in the air stream from nitrogen using solar energy so as to provide an oxygen stream,
using the oxygen stream in an oxy-fuel combustion reaction to produce a carbon dioxide stream In some embodiments, the combustion reaction is carried out in an electrical power generation plant, preferably a fossil fuel power station, and/or in a sulfur recovery unit.

In some embodiments, the carbon dioxide stream produced using solar energy is stored in tanks or pipelines to be injected as a fluid into the subterranean formation during at least part of nighttime.

The present invention enables to meet the abovementioned need. In particular the invention provides a method for extracting hydrocarbons from a subterranean formation in an efficient manner, that is cost-effective, sustainable, and that does not require a high consumption of fossil fuel energy. The invention also avoids the storage of significant amounts of electric or heat energy.

This is achieved by coupling the injection of a fluid into the subterranean formation with the day/night cycle and/or the seasonal cycle, in order to efficiently use solar energy in the method, either to provide power to compressors for the injection process (in this case, any type of fluid can be injected), or to provide heat or electricity to capture carbon dioxide which may then be injected into the subterranean formation, or both. According to the invention, the fluid is not injected into the subterranean formation during a second period of time, so that less energy, or even no energy, is necessary to power the compressors or to capture $CO_2$ during this period of time when solar energy is not available or less available. This makes it possible to further reduce fossil fuel energy consumption.

According to particular embodiments, the invention enables to carry out a Water-Alternating-Gas (WAG) process in which the gas injection/water injection cycles are based on day/night cycles and/or seasonal cycles (gas being injected during daytime or during a period including the summer solstice, and water during nighttime or during a period including the winter solstice). This makes it possible to continuously extract hydrocarbons without necessitating high consumption of fossil fuel energy. Moreover, this technique makes it possible to stabilize the gas injection by creating a three-phase zone (gas-water-oil) in the reservoir. This three-phase zone reduces the migration of the injected gas to the top of the reservoir (due to the lower viscosity of gas compared to that of oil) and of the injected water to the bottom of the reservoir (due to the higher density of water compared to that of oil), making them more effective at displacing oil in the reservoir.

DETAILED DESCRIPTION

The invention will now be described in more detail without limitation in the following description.

The invention may relate to a method for extracting hydrocarbons from a subterranean formation, comprising:
injecting a fluid into the subterranean formation during a first period of time,
not injecting said fluid during a second period of time, and
collecting hydrocarbons displaced by the injected fluid, wherein:
the fluid injection during the first period of time is at least partly carried out using solar energy and/or
the method further comprises a step of producing a carbon dioxide stream using solar energy.

Advantageously, the carbon dioxide stream is injected as a fluid into the subterranean formation. More preferably, it is injected as a fluid into the subterranean formation during the first period of time. Thus, at least part of the fluid injected into the subterranean formation to displace hydrocarbons may be produced using solar energy, making it possible to reduce fuel energy consumption. The step of producing a carbon dioxide stream is one embodiment of the fluid provision step of the method of the invention.

By "fluid" is meant any gas, liquid or supercritical fluid, or any mixture thereof.

In some embodiments, the first period of time is at least part of daytime and the second period of time is at least part of nighttime. In particular embodiments, the first period of time is substantially the whole daytime and/or the second period of time is substantially the whole nighttime.

By "daytime" is preferably meant the period in which there is solar availability, that is to say in which sunlight is available, including when the sky is cloudy. Preferably, "daytime" means the period from sunrise to sunset and more preferably the period in which illuminance in the environment is higher than 10 Lux. Most preferably, illuminance in the environment is higher than 100 Lux during daytime.

By "nighttime" is preferably meant the period in which there is no solar availability. Preferably, it is meant the period from sunset to sunrise and more preferably the period in which illuminance in the environment is lower than 1 Lux. Most preferably, illuminance in the environment is lower than 0.5 Lux during nighttime.

The duration of daytime and nighttime varies depending on the time of the year and is therefore defined by taking into account the seasonal cycle. In addition, it also depends on the geographic position. Thus, for example beyond the Arctic Circle, daytime may last for several calendar days, or several weeks or several months, for example from 3 to 6 months. Similarly, nighttime may last for several calendar days, or several weeks or several months, for example from 3 to 6 months.

In some embodiments, the first period of time is a period including the summer solstice and the second period of time is a period including the winter solstice. For example, the first period of time includes the summer and the second period of time includes the winter. Preferably, the first period of time is a period of three to nine months including, preferably centered on, the summer solstice and the second period of time is a period of three to nine months including, preferably centered on, the winter solstice. The first period of time may be a period of four to eight months, such as six months, including, preferably centered on, the summer solstice and the second period of time may be a period of four to eight months, such as six months, including, preferably centered on, the winter solstice. By "summer solstice" and "winter solstice" is meant the summer solstice and winter solstice respectively as defined at the location where the fluid is injected into the subterranean formation.

In periods of time surrounding the summer solstice, the daytime periods are longer than in periods surrounding the winter solstice. Therefore, more solar energy is available in periods of time surrounding the summer solstice than in periods surrounding the winter solstice, and solar energy may be more efficiently used to produce electricity or heat.

According to the invention, hydrocarbons in gaseous and/or liquid phase are recovered from a subterranean formation. Preferably, hydrocarbon recovery includes oil recovery and/or natural gas recovery.

The temperature within the subterranean formation may range from 25 to 140° C., preferably from 80 to 140° C. and more preferably from 100 to 120° C.

The permeability of at least a portion of the subterranean formation may range from $1 \times 10^{-9}$ to $1 \times 10^5$ md, preferably from 1 to 100 md, as estimated by well log.

Hydrocarbon Recovery—First Period of Time

The invention comprises injecting a fluid into the subterranean formation during a first period of time. Preferably, said injection is performed via one or several injecting wells, while hydrocarbon collection is performed via one or more production wells.

In some embodiments, the injected fluid comprises or consists of one or more gas. Preferably, the injected fluid comprises, or is, carbon dioxide and/or natural gas and/or nitrogen and/or hydrogen sulfide. More preferably, the injected fluid is carbon dioxide. Carbon dioxide may be in the form of gas or supercritical fluid.

In some embodiments, the injected fluid comprises both gas and an aqueous solution. The gas may be injected simultaneously with an aqueous solution. The aqueous solution is preferably water or brine, optionally containing various additives, such as surfactants, salts, sacrificial agents, mobility control polymers, pH adjustment agents, solvents, marking agents, etc. The aqueous solution and the gas may be injected via different injection wells or via the same injection well(s), for example they can be injected via distinct inlets within a same injection well. Alternatively, the aqueous solution and the gas can be premixed and injected as one composition via the same inlet(s), although this is generally not preferred due to the high pressure drop generated by the gas/water emulsion in the well(s). Gas/water emulsions which are either generated in situ or premade are preferably characterized by a gas/water volume fraction ratio of more than 1.

In some embodiments, the injected fluid comprises or is an aqueous solution, which may be as described above.

In other embodiments, only gas is injected into the subterranean formation.

In some embodiments, the first period of time is at least part of daytime.

In advantageous embodiments, the fluid is injected into the subterranean formation during substantially the whole daytime, for example only gas, or only an aqueous solution, is injected into the subterranean formation during substantially the whole daytime.

In some embodiments, only an aqueous solution is injected into the subterranean formation during a part of daytime, gas being injected into the subterranean formation another part of daytime.

In some embodiments, the first period of time is a period including the summer solstice.

According to the invention, the step of injecting the fluid into the subterranean formation during the first period of time may be at least partly carried out using solar energy.

Advantageously, the step of injecting the fluid into the subterranean formation is carried out using solar energy during at least part of daytime. Thus, when the first period of time is, for example, at least a part of daytime, the step of injecting the fluid into the subterranean formation may be entirely carried out using solar energy. When the first period of time is, for example, a period including the summer solstice, such as a period of three to nine months including the summer solstice, solar energy may be used at least part of daytime, preferably substantially the whole daytime, to carry out the injecting step, whereas the injecting step is carried out using another type of energy, such as fossil fuel energy, during at least part of nighttime, preferably the whole nighttime.

In particular, solar photovoltaic energy may be used to at least partly power one or more electrical compressors used to inject the fluid (be it a gas, or an aqueous solution, or any other fluid) into the subterranean formation. Photovoltaic energy may be produced using one or more photovoltaic panels. Preferably, the photovoltaic panels are located close to the compressors.

At typical low latitudes, daytime may last from 6 to 18 hours per day, preferably from 8 to 16 hours per day, more preferably from 10 to 14 hours per day. The daytime steps (i.e. the above steps performed during the first period of time when the first period of time is at least part of daytime, preferably substantially the whole daytime) may last from 6 to 18 hours per day, preferably from 8 to 16 hours per day, more preferably from 10 to 14 hours per day. As the amount of solar energy available may be low during part of daytime, the above daytime steps may typically be performed during 8 to 10 hours per day or, typically, during 6 to 10 hours per day. At extreme latitudes where sun availability is dominated by seasonal rather than diurnal cycles, the daytime steps may be performed for longer times, for example in places where daytime lasts more than one calendar day. Thus, they may be performed for example for several calendar days, or several weeks, or several months each year.

In some embodiments, the amount of solar energy generated in the early morning may be relatively low, so that the above daytime steps may be performed from a starting time which may be between 0.5 hour to 2 hours after sunrise, In some embodiments, solar energy may be somewhat accumulated and thus remain available until sunset or even for a certain period of time thereafter. Therefore, the daytime steps may be performed until an ending time which may be between 1 hour before sunset and 2 hours after sunset, preferably between 0.5 hour before sunset and 1 hour after sunset.

Hydrocarbon Recovery—Second Period of Time

According to the method of the invention, the fluid injected during the first period of time is not injected during the second period of time.

The invention also includes embodiments in which a fluid is injected into the subterranean formation during the second period of time (for example during part of nighttime), provided that the nature or composition of the fluid is different from the fluid injected during the first period of time (for example during at least part of daytime).

Preferably, the method of the invention comprises injecting an aqueous solution into the subterranean formation during at least part of the second period of time, preferably during the second period of time (for example during at least part of nighttime, or during substantially the whole nighttime). The hydrocarbons displaced by the injected aqueous solution are then collected. These embodiments are particularly advantageous when the fluid injected during the first period of time (for example during at least part of daytime) comprises or is gas. More preferably, the aqueous solution is injected into the subterranean formation when no injection of gas is performed. In certain embodiments, aqueous solution injection may be carried as soon as gas injection is stopped.

The aqueous solution may be as described above. In particular, it may be water or brine, and it may comprise the abovementioned additives.

The aqueous solution may be injected simultaneously with gas, provided that the fluid injected during the first period of time (for example during at least part of daytime) is not injected during the second period of time (for example during a part of nighttime).

In some embodiments, no injection into the subterranean formation is carried out during at least part of the second period of time, preferably during the second period of time (for example during at least part of nighttime, or during substantially the whole nighttime), that is to say neither gas nor aqueous solution is injected. In such embodiments, fluid injection, in particular during the first period of time (for example during daytime), is adjusted, so that the pressure within the subterranean formation is maintained at a substantially constant level over time, despite a continuous extraction of hydrocarbons and a discontinuous fluid injection. In preferred embodiments, when the fluid injected during the first period of time (for example during at least part of daytime) is an aqueous solution, no injection into the subterranean formation is carried out during the second period of time (for example during at least part of nighttime, or during substantially the whole nighttime).

The invention also includes embodiments wherein a certain gas (or a gas with a certain composition, for example a gas comprising mainly carbon dioxide) is injected into the subterranean formation during the first period of time and a different gas (or a gas with a different composition, for example a gas with a lower carbon dioxide proportion) is injected during the second period of time. In particular, a certain gas (or a gas with a certain composition, for example a gas comprising mainly carbon dioxide) may be injected into the subterranean formation during at least part of daytime, such as during substantially the whole daytime while a different gas (or a gas with a different composition, for example a gas with a lower carbon dioxide proportion) is injected during at least part of nighttime, such as during substantially the whole nighttime. The gas comprising mainly carbon dioxide that can be injected during the first period of time (for example during at least part of daytime, or during substantially the whole daytime) may be a carbon dioxide stream produced as described below.

For example, a gas comprising from 2 to 25% by weight of carbon dioxide and from 75 to 98% by weight of methane may be injected during the second period of time (for example during at least part of nighttime, or during substantially the whole nighttime) while a different gas comprising from 70 to 99.9% of carbon dioxide and from 0.1 to 30% by weight of methane is injected during the first period of time (for example during at least part of daytime, or during substantially the whole daytime). Thus, the gas injected into the subterranean formation during the second period of time (for example during at least part of nighttime, or during substantially the whole nighttime) may be natural gas (comprising mainly methane and a lower proportion of carbon dioxide) while the gas injected into the subterranean formation during the first period of time (for example during at least part of daytime, or during substantially the whole daytime) is a carbon dioxide stream (comprising mainly carbon dioxide) obtained through a $CO_2$ capture process, preferably obtained at least partly, and more preferably completely, through production of a carbon dioxide stream using solar energy as described below, for example performed on a gas stream that is the same natural gas that is injected during the second period of time (for example during at least part of nighttime).

In other examples, a gas comprising from 2 to 30% by weight of carbon dioxide and from 70 to 98% by weight of nitrogen may be injected during the second period of time (for example during at least part of nighttime or during substantially the whole nighttime) while a different gas comprising from 70 to 99.9% of carbon dioxide and from 0.1 to 30% by weight of nitrogen is injected during the first period of time (for example during at least part of daytime or during substantially the whole daytime). Thus, the gas injected into the subterranean formation during the second period of time (for example during at least part of nighttime or during substantially the whole nighttime) may be a flue gas stream (comprising mainly nitrogen and a lower proportion of carbon dioxide) while the gas injected into the subterranean formation during the first period of time (for example during at least part of daytime, or during substantially the whole daytime) is a carbon dioxide stream (comprising mainly carbon dioxide) obtained through a $CO_2$ capture process, preferably obtained at least partly, and more preferably completely, through production of a carbon dioxide stream using solar energy as described below, for example performed on a gas stream that is the same flue gas stream that is injected during the second period of time (for example during at least part of nighttime).

In some embodiments, the first period of time is at least part of daytime and the second period of time is at least part of nighttime. In advantageous embodiments, the second period of time is substantially the whole nighttime.

The above nighttime steps (i.e. the above steps performed during the second period of time when the second period of time is at least part of nighttime, preferably substantially the whole nighttime) may be performed for example for 6 to 18 hours per day, preferably from 8 to 16 hours per day, more preferably from 10 to 14 hours per day. As the amount of solar energy available may be low during part of daytime, the above nighttime steps may typically be performed during 14 to 16 hours per day. They may also be performed for longer times, for example in places where nighttime lasts more than one calendar day. Thus, they may be performed for example for several calendar days, or several weeks, or several months per year.

In certain embodiments, the fluid injected during at least part of daytime may be water, and power for said water injection may be derived from solar energy. In this embodiment, water injection may occur for at least part of daytime, or during substantially the whole daytime, whereas no injection may occur during at least part of nighttime, or substantially during the whole nighttime. In high latitudes, this injection may last for several weeks or months.

In some embodiments, the first period of time is a period including the summer solstice and the second period of time is a period including the winter solstice.

In certain embodiments, the fluid injected during a period including the summer solstice, for example during a period of three to nine months centered on the summer solstice, may be a gas, while no injection, or injection of an aqueous solution, or injection of a gas with a different composition, such as described above, may be carried during a period including the winter solstice, for example during a period of three to nine months centered on the winter solstice. For example, a gas comprising mainly carbon dioxide, preferably obtained at least partly through production of a carbon dioxide stream using solar energy as described below, may be injected during a period including the summer solstice, for example during a period of three to nine months centered on the summer solstice, while a gas with a lower carbon dioxide proportion, preferably natural gas or a flue gas stream, may be injected during a period including the winter solstice, for example during a period of three to nine months centered on the winter solstice. Preferably, a gas is injected during a period including the summer solstice, for example during a period of three to nine months centered on the summer solstice, while no injection is carried during a period including the winter solstice, for example during a period of three to nine months centered on the winter solstice.

Cyclic Extraction

Preferably, the above described steps are implemented on a cyclic basis, that is to say, they are repeated, for example every 24 hours (in particular when the first and second periods of time are respectively at least part of daytime and nighttime) or at a lower frequency (in particular, when the first and second periods of time are respectively at least part of daytime or nighttime, if daytime and/or nighttime last longer than 24 hours, or when the first and second periods of time are respectively a period of time including the summer and winter solstices), such as every year. Thus, advantageously, the method comprises a step of injecting a fluid into the subterranean formation during the first period of time (for example during at least part of daytime, such as substantially the whole daytime, every first period of time (for example every daytime period) and a step of not injecting said fluid during the second period of time (for example during at least part of nighttime)—and optionally a step of injecting an aqueous solution during at the second period of time (for example during at least a part of nighttime, such as substantially the whole nighttime)— every second period of time (for example nighttime period), for a certain period of time. This period of time may be of at least 1 calendar day, or at least 1 week, or at least 1 month, or at least 2 months, or at least 3 months, or at least 4 months, or at least 6 months, or at least 1 year, or at least 5 years, or at least 10 years.

Carbon Dioxide Production

The method of the invention may comprise a step of producing a carbon dioxide stream using solar energy.

Preferably, this step is carried out during at least part of daytime. More preferably, this step is carried out during substantially the whole daytime.

Advantageously, the step of producing a carbon dioxide stream using solar energy is carried out during at least part of daytime, simultaneously with the step of injecting the fluid into the subterranean formation. In preferred embodiments, the carbon dioxide stream produced during at least part of daytime is injected into the subterranean formation as a fluid. The carbon dioxide stream may be injected into the subterranean formation in the form of a gas or a supercritical fluid.

The carbon dioxide stream produced using solar energy may be directly used, preferably by being injected into the subterranean formation. These embodiments have the advantage that no gas storage is needed.

Alternatively, or in addition, the carbon dioxide stream produced using solar energy may be stored, for example for a period of time of 1 minute to 6 months, or for a period of time of 1 minute to 12 hours. The stored carbon dioxide stream may be used later, in particular carbon dioxide may be injected into the subterranean formation during part of nighttime. Carbon dioxide may be stored in tanks. Alternatively, or in addition, it may be stored in pipelines, for example by increasing the pressure in the pipelines, and then released by decreasing the pressure. These embodiments have the advantage that the gas produced using solar energy may be used for a longer period of time, also when solar energy is not available, for example during a part of nighttime.

In some embodiments, no storage of carbon dioxide takes place.

Preferably, the step of producing carbon dioxide using solar energy is not performed at least part of nighttime, more preferably it is not performed during substantially the whole nighttime.

In a first variant, the step of producing a carbon dioxide stream using solar energy may comprise:
  providing a gas stream containing carbon dioxide;
  contacting the gas stream with a liquid solvent so that at least part of the carbon dioxide contained in the gas stream is absorbed by the liquid solvent, so as to provide a carbon dioxide-enriched solvent,
  heating the carbon dioxide-enriched solvent using solar energy so that at least part of the carbon dioxide contained in the dioxide-enriched solvent is separated from the solvent, so as to obtain a regenerated liquid solvent and the carbon dioxide stream.

The gas stream containing carbon dioxide may be any type of gas stream. It may be a gas stream originating from a subterranean formation, preferably the subterranean formation in which gas is injected. Thus, carbon dioxide contained in the gas stream may be carbon dioxide naturally present in the reservoir and/or may be carbon dioxide which was injected into the subterranean formation. In this case, the method may comprise a step of processing the collected hydrocarbons so as to separate the gas stream containing carbon dioxide from liquid (including oil and water) and/or solids.

The gas stream containing carbon dioxide may also be a flue gas stream originating from an electrical power plant, and preferably a fossil fuel power station such as a coal-fired power station or a gas-fired power station. The gas stream may also be a flue gas stream coming from a sulfur recovery unit (SRU). Indeed, in the underground reservoir, carbon dioxide is often associated with hydrogen sulfide ($H_2S$), a poisonous gas. Therefore, gas released from the reservoir may be treated in an SRU to prevent hydrogen sulfide from being released to the ambient air. In an SRU, the sulfur recovery process is often based on a Claus process. In a first step of said Claus process, the hydrogen sulfide is partially burned with a combustive such as air or oxygen in a Claus furnace to form sulfur dioxide that will react, in a second step, with hydrogen sulfide to form elemental sulfur. The remaining $H_2S$ traces may be captured in a Tail Gas Treatment Unit (TGTU), positioned at the outlet of the Claus unit to significantly increase sulfur recovery.

Depending on its origin, the gas stream containing carbon dioxide may comprise, in addition to carbon dioxide, nitrogen, methane, hydrogen sulfide, mercaptans . . . .

The process of capturing carbon dioxide using solvents is well known by the skilled person. This process comprises a step of contacting the gas stream with a liquid solvent so that at least part of the carbon dioxide contained in the gas stream is absorbed by the liquid solvent. The liquid solvent preferably comprises or consists in an amine compound. Examples of amine compounds suitable for the invention are monoethanolamine (MEA), diethanolamine (DEA), methyldiethanolamine (MDEA), diisopropanolamine (DIPA), aminoethoxyethanol (Diglycolamine) and combinations thereof. Preferably, this step takes place in an absorber. Then, the carbon dioxide-enriched solvent is heated so that at least part of the carbon dioxide contained in the dioxide-enriched solvent is separated from the solvent. The solvent is thus regenerated, and a carbon dioxide stream may be recovered. The solvent regeneration usually takes place in a stripper (or desorber).

In the present invention, the step of heating the carbon dioxide-enriched solvent so that at least part of the carbon dioxide contained in the dioxide-enriched solvent is separated from the solvent is preferably carried out using solar energy. In particular, solar thermal energy is advantageously used. Thermal energy to be used to separate carbon dioxide from the liquid solvent may be collected using one or more solar thermal collectors. The heat is then transferred to a working fluid that is used to heat the carbon dioxide-enriched solvent.

Alternatively, solar photovoltaic energy may be used to heat solvent, for instance by resistive heating. Photovoltaic energy may be produced using one or more photovoltaic panels.

Preferably, the carbon dioxide-enriched solvent is heated at a temperature of from 60 to 200° C., more preferably from 80 to 180° C.

In a second variant, the step of producing a carbon dioxide stream using solar energy may comprise:
providing a gas stream containing carbon dioxide,
contacting the gas stream with a membrane so as to recover a carbon dioxide stream in the permeate, and
compressing the carbon dioxide stream using solar energy.

The gas stream may be as described above.

The process of capturing carbon dioxide using membranes is well known by the skilled person.

The membrane may comprise or consist of materials such as zeolite, ceramic, polymer or silica.

The compression step is preferably performed using one or more electrical compressor(s). Preferably, at least the compressor(s) is/are at least partially, preferably completely, powered by solar photovoltaic energy. Photovoltaic energy may be produced using one or more photovoltaic panels. Preferably, the photovoltaic panels are located close to the compressor(s).

In a third variant, the step of producing a carbon dioxide stream using solar energy may comprise:
providing a gas stream containing carbon dioxide,
compressing the gas stream containing carbon dioxide using solar energy,
cooling the compressed gas stream so that carbon dioxide liquefies and/or solidifies,
separating liquid and/or solid carbon dioxide from gaseous light gases, so as to recover the carbon dioxide stream.

In an alternative third variant, the step of producing a carbon dioxide stream using solar energy may comprise:
providing a gas stream containing carbon dioxide,
cooling the gas stream so that carbon dioxide liquefies and/or solidifies,
separating liquid and/or solid carbon dioxide from gaseous light gases,
compressing the liquid and/or solid carbon dioxide using solar energy, so as to recover the carbon dioxide stream.

The gas stream may be as described above.

The cryogenic $CO_2$ capture processes are well known by the skilled person.

Preferably, the gas stream or compressed gas stream is cooled down to a temperature of from −100 to −150° C. The gas stream or compressed gas stream may be cooled in a heat exchanger, for example using a refrigerant comprising n-butane, propane, ethane, methane or mixtures thereof.

The compression step is preferably performed using one or more electrical compressor(s). Preferably, at least the compressor(s) is/are at least partially, preferably completely, powered by solar photovoltaic energy. Photovoltaic energy may be produced using one or more photovoltaic panels. Preferably, the photovoltaic panels are located close to the compressor(s).

At least a part of the produced gaseous light gas and/or a part of the produced carbon dioxide stream may be used in the heat exchanger to cool the gas stream or the compressed gas stream.

The liquid and/or solid carbon dioxide or compressed liquid and/or solid carbon dioxide may be converted into gas or supercritical fluid.

In the above described three variants, the remaining gases of the gas stream after carbon dioxide separation may be used in any known manner, for example by being injected into a subterranean formation, for example in the method of the invention, or may be released to the environment, optionally after being subjected to further treatments.

In a fourth variant, the step of producing a carbon dioxide stream using solar energy may comprise:
providing an air stream,
separating at least part of the oxygen contained in the air stream from nitrogen so as to provide an oxygen stream,
using the oxygen stream in a combustion reaction to produce a carbon dioxide stream.

This variant uses an oxy-fuel combustion reaction. An oxy-fuel combustion reaction has the advantage of releasing pure, or essentially pure, carbon dioxide (vs. a mixture of carbon dioxide and nitrogen in the case where a combustion is carried out using air). Therefore, a carbon dioxide stream is directly recovered from the oxy-fuel combustion without needing to further separate carbon dioxide from other gases.

The combustion (or oxy-fuel combustion) may be any kind of combustion. For example, the combustion may be carried out in an electrical power plant, and preferably a fossil fuel power station such as coal-fired power station or a gas-fired power station. The combustion may also be carried out in a sulfur recovery unit (SRU). The fuel used in the combustion reaction may be a fossil fuel such as natural gas, fuel oil, petroleum coke, or mixtures thereof.

According to the invention, the step of separating at least part of the oxygen contained in the air stream from nitrogen so as to provide an oxygen stream is preferably performed using solar energy. The separation of oxygen from nitrogen may be carried out by a cryogenic fractional distillation process using solar energy, preferably solar photovoltaic energy. Solar energy may be collected and transferred as described above, such as by means of electrical compressors and/or photovoltaic panels.

Nitrogen from which oxygen is separated may be used in any known manner, for example by being injected into a subterranean formation, for example in the method of the invention, or may be released to the environment, optionally after being subjected to further treatments.

The above described four variants may be alternative variants or any combination thereof may be used in the method of the invention.

Preferably, all process steps using solar energy, be it solar thermal energy and/or solar photovoltaic energy, described in the present description (in particular in the above four variants) are carried out during at least part of daytime. More preferably, they are not carried out during at least part of nighttime, even more preferably substantially the whole nighttime. In some embodiments, they are carried out during substantially the whole daytime.

In some embodiments, no production of a carbon dioxide stream is implemented at least part of nighttime, for example during substantially the whole nighttime. In these embodiments, when no production of a carbon dioxide stream is performed, the gas stream containing carbon dioxide may be directly released to the ambient environment, in particular if it comes from an electrical power plant or an SRU, or more generally if it does not contain poisonous gases. If the gas stream originates from a subterranean formation, it may be treated in an SRU before being released. More particularly, if the gas stream contains hydrogen sulfide, it is preferably treated through an SRU, but if it contains no hydrogen sulfide, such an SRU treatment is not necessary.

In some embodiments, the method may comprise a step of producing a carbon dioxide stream during at least a part of nighttime, for example during substantially the whole nighttime, using another energy than solar energy, for example fossil fuel energy.

In particular, the method may comprise, during a period including the summer solstice, a step of producing a carbon dioxide stream during at least a part of daytime, for example during substantially the whole daytime, using solar energy, and a step of producing carbon dioxide during at least a part of nighttime, for example during substantially the whole nighttime, using another energy than solar energy such as fossil fuel energy. The method may also comprise no production of a carbon dioxide stream during a period including the winter solstice.

The invention claimed is:

1. A method for extracting hydrocarbons from a subterranean formation, comprising:
   providing a fluid,
   injecting said fluid into the subterranean formation during a first period of time but not during a second period of time,
   injecting an aqueous solution into the subterranean formation during at least part of the second period of time, and
   collecting displaced hydrocarbons from the subterranean formation,
   wherein:
   at least part of the providing and/or injecting of the fluid is carried out using solar energy;
   the first period of time is at least part of daytime and the second period of time is at least part of nighttime, and/or the first period of time is a period including summer solstice and the second period of time is a period including winter solstice; and
   the fluid which is provided and injected comprises gas or supercritical fluid.

2. The method of claim 1, wherein the fluid which is provided and injected comprises at least one of: natural gas and carbon dioxide.

3. The method of claim 1, wherein the step of injecting the fluid into the subterranean formation is carried out during at least part of daytime and the step of injecting an aqueous solution into the subterranean formation is carried out during at least part of nighttime.

4. The method of claim 1, wherein the aqueous solution is water or brine.

5. The method of claim 1, wherein no injection into the subterranean formation is carried out during at least part of the second period of time.

6. The method of claim 5, wherein the step of injecting the fluid into the subterranean formation is carried out during at least part of daytime and no injection into the subterranean formation is carried out during at least part of nighttime.

7. The method of claim 1, wherein the step of injecting the fluid into the subterranean formation is carried out during a whole daytime.

8. The method of claim 1, wherein the fluid injection during the first period of time is carried out using one or more electric compressors which are at least partially powered by solar photovoltaic energy.

9. The method of claim 1, wherein the fluid comprises a carbon dioxide stream which is produced using solar energy during at least part of daytime and wherein optionally the carbon dioxide stream produced using solar energy is stored in tanks or pipelines to be injected as a fluid into the subterranean formation during at least part of nighttime.

10. The method of claim 9, wherein the step of producing a carbon dioxide stream using solar energy is carried out during a whole daytime.

11. The method of claim 9, wherein the produced carbon dioxide stream is injected into the subterranean formation during at least part of daytime.

12. The method of claim 9, wherein the production of a carbon dioxide stream using solar energy comprises the steps of:
   providing a gas stream containing carbon dioxide;
   contacting said gas stream with a liquid solvent so that at least part of the carbon dioxide contained in the gas stream is absorbed by the liquid solvent, so as to provide a carbon dioxide-enriched solvent, heating the carbon dioxide-enriched solvent using solar thermal energy so that at least part of the carbon dioxide contained in the carbon dioxide-enriched solvent is separated from the solvent, so as to obtain a regenerated liquid solvent and the carbon dioxide stream.

13. The method of claim 12, wherein the liquid solvent is or comprises an amine compound.

14. The method of claim 12, wherein the gas stream containing carbon dioxide comes from the subterranean formation and/or from an electrical power generation plant and/or from a sulfur recovery unit.

15. The method of claim 9, wherein the production of a carbon dioxide stream using solar energy comprises the steps of:

providing a gas stream containing carbon dioxide;

contacting the gas stream with a membrane so as to recover a carbon dioxide stream in permeate, and compressing the carbon dioxide stream using one or more electrical compressors at least partially powered by solar photovoltaic energy.

16. The method of claim 9, wherein the production of a carbon dioxide stream using solar energy comprises the steps of:

providing a gas stream containing carbon dioxide, compressing the gas stream containing carbon dioxide using solar energy, cooling the compressed gas stream so that carbon dioxide liquefies and/or solidifies, and separating liquid and/or solid carbon dioxide from gaseous light gases, so as to recover the carbon dioxide stream.

17. The method of claim 9, wherein the production of a carbon dioxide stream using solar energy comprises the steps of:

providing an air stream, separating at least part of oxygen contained in the air stream from nitrogen using solar energy so as to provide an oxygen stream, and using the oxygen stream in an oxy-fuel combustion reaction to produce a carbon dioxide stream.

18. The method of claim 17, wherein the combustion reaction is carried out in an electrical power generation plant.

* * * * *